(12) United States Patent
Lattin

(10) Patent No.: US 8,635,865 B2
(45) Date of Patent: Jan. 28, 2014

(54) DIESEL PARTICULATE FILTER INCLUDING A HEAT EXCHANGER

(75) Inventor: Robert Michael Lattin, Minneapolis, MN (US)

(73) Assignee: Thermo King Corporation, Minneapolis, MN (US)

(*) Notice: Subject to any disclaimer, the term of this patent is extended or adjusted under 35 U.S.C. 154(b) by 935 days.

(21) Appl. No.: 12/233,383

(22) Filed: Sep. 18, 2008

(65) Prior Publication Data

US 2009/0071134 A1    Mar. 19, 2009

Related U.S. Application Data

(60) Provisional application No. 60/973,333, filed on Sep. 18, 2007.

(51) Int. Cl.
*F01N 3/02* (2006.01)
*F01N 3/00* (2006.01)

(52) U.S. Cl.
USPC ................... 60/320; 60/274; 60/297; 60/311

(58) Field of Classification Search
USPC ............ 422/108, 173, 204, 274, 299; 60/320, 60/297–299, 311, 274
See application file for complete search history.

(56) References Cited

U.S. PATENT DOCUMENTS

| 4,558,565 A | 12/1985 | Kojima et al. |
| 4,671,059 A | 6/1987 | Lawson |
| 4,813,233 A | 3/1989 | Vergeer et al. |
| 4,974,414 A | 12/1990 | Kono et al. |
| 5,460,511 A | 10/1995 | Grahn |
| 6,115,919 A | 9/2000 | Oswald et al. |
| 6,207,116 B1 * | 3/2001 | Heed .............................. 422/173 |
| 6,935,105 B1 * | 8/2005 | Page et al. ........................ 60/298 |
| 7,104,051 B2 | 9/2006 | Shimasaki et al. |
| 7,160,355 B2 | 1/2007 | Steiner |
| 7,900,443 B2 * | 3/2011 | Stieglbauer ..................... 60/297 |
| 2006/0096281 A1 | 5/2006 | Huang |
| 2006/0096282 A1 * | 5/2006 | Friedrich et al. ................ 60/299 |
| 2006/0213184 A1 | 9/2006 | Stewart |

* cited by examiner

*Primary Examiner* — Thomas Denion
*Assistant Examiner* — Diem Tran
(74) *Attorney, Agent, or Firm* — Michael Best & Friedrich LLP

(57) ABSTRACT

An after treatment device includes a housing defining an inlet and an outlet. The after treatment device also includes a core positioned substantially within the housing. The core is configured to treat a fluid. The after treatment device further includes a heat exchanger positioned substantially within the housing and about at least a portion of the core. The heat exchanger includes a first passage substantially surrounding the at least a portion of the core and configured to direct untreated fluid from the inlet toward the core, and a second passage substantially surrounding the at least a portion of the core and configured to direct treated fluid from the core toward the outlet.

25 Claims, 3 Drawing Sheets

DIESEL PARTICULATE FILTER INCLUDING A HEAT EXCHANGER

CROSS-REFERENCE TO RELATED APPLICATIONS

This application claims priority to U.S. Provisional Patent Application No. 60/973,333, filed Sep. 18, 2007, the entire contents of which are hereby incorporated by reference.

BACKGROUND

The present invention relates to high-temperature chemical reactions and, more particularly, to diesel particulate filters.

Diesel engines commonly emit exhaust containing fine organic particulate matter that should be removed prior to releasing the exhaust into the surrounding environment. Currently, removal of this particulate matter is performed by in-cylinder methods, where particulate matter is inhibited from forming during the combustion process, or by after treatment devices, where already-produced particulate matter is reduced or converted to an acceptable form of waste.

Typical after treatment devices include, for example, diesel particulate filters, diesel oxidation catalysts, and continually regenerating filters. When using after treatment devices, sometimes the exhaust needs to attain a minimum operating temperature, or critical temperature, to ensure proper functioning and operation of the devices. For example, carbon particulate matter can typically sustain an oxidation reaction between about 500° C. and 800° C. This temperature may be influenced by the presence of a catalyst, the desired reaction, and/or the exact chemical species being reacted. In addition, the completeness of the reaction may be influenced by the amount of time at the critical temperature, the chemical compound of the species being reacted, and the availability of reactants (e.g., oxygen) at the reaction site.

If the diesel exhaust does not reach this critical temperature, the after treatment devices should be periodically heated. In such scenarios, extra energy is required and expended in order to reach the critical temperature. For example, heat may be applied to the exhaust flowing into the after treatment devices or directly applied to an active surface or substrate within the devices. However, such an addition of heat can increase fuel consumption and/or add complexity to the after treatment devices.

SUMMARY

In one embodiment, the invention provides an after treatment device including a housing defining an inlet and an outlet. The after treatment device also includes a core positioned substantially within the housing. The core is configured to treat a fluid. The after treatment device further includes a heat exchanger positioned substantially within the housing and about at least a portion of the core. The heat exchanger includes a first passage substantially surrounding the at least a portion of the core and configured to direct untreated fluid from the inlet toward the core, and a second passage substantially surrounding the at least a portion of the core and configured to direct treated fluid from the core toward the outlet.

In another embodiment, the invention provides an exhaust system including an engine and an after treatment device. The after treatment device includes a housing defining an inlet in communication with the engine and an outlet. The after treatment device also includes a core positioned substantially within the housing. The core is configured to treat exhaust from the engine. The after treatment device further includes a heat exchanger positioned substantially within the housing and about at least a portion of the core. The heat exchanger includes a first passage substantially surrounding the at least a portion of the core and configured to direct untreated exhaust from the inlet toward the core, and a second passage substantially surrounding the at least a portion of the core and configured to direct treated exhaust from the core toward the outlet In yet another embodiment, the invention provides a method of treating exhaust from an engine with an after treatment device. The after treatment device includes a housing defining an inlet in communication with the engine and an outlet, a core positioned substantially within the housing, and a heat exchanger. The method includes positioning the heat exchanger substantially within the housing of the after treatment device and about at least a portion of the core. The heat exchanger includes a first passage substantially surrounding the at least a portion of the core and a second passage substantially surrounding the at least a portion of the core. The method also includes directing untreated exhaust from the inlet of the after treatment device through the first passage toward the core, treating the untreated exhaust at the core, and directing treated exhaust from the core through the second passage toward the outlet of the after treatment device.

Other aspects of the invention will become apparent by consideration of the detailed description and accompanying drawing.

DETAILED DESCRIPTION

Before any embodiments of the invention are explained in detail, it is to be understood that the invention is not limited in its application to the details of construction and the arrangement of components set forth in the following description or illustrated in the following drawing. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
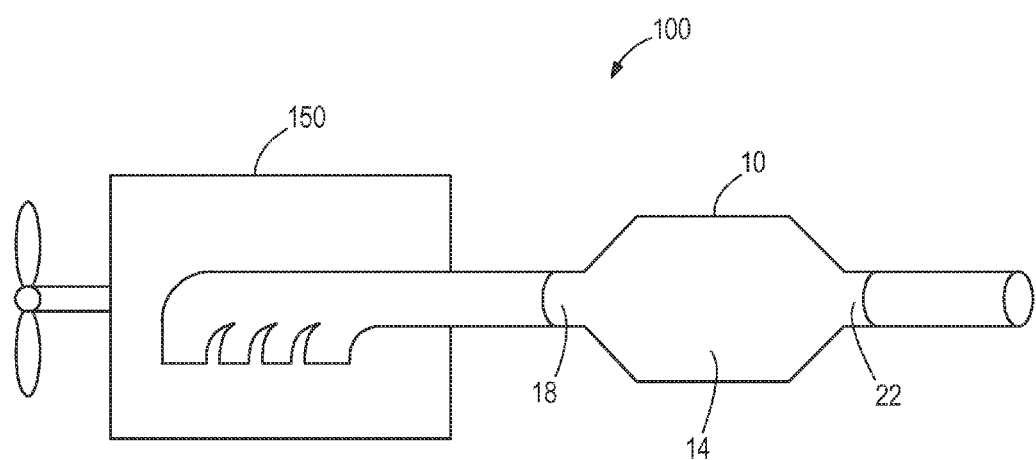
FIG. 1 is a schematic of an exhaust system of a diesel engine according to an embodiment of the invention.
Figure 2:
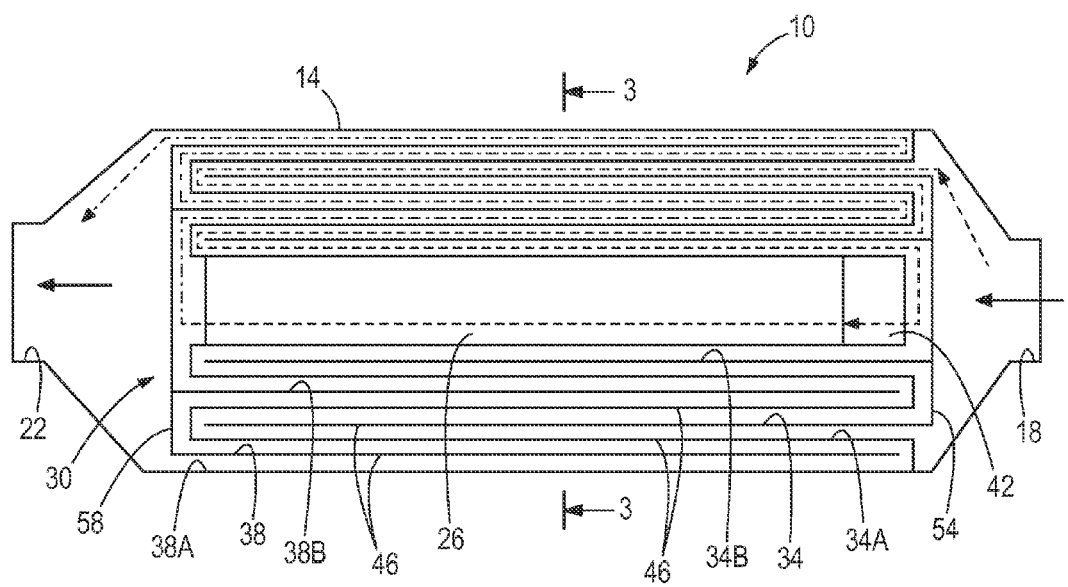
FIG. 2 is a cross-sectional view of a diesel particulate filter for use in the exhaust system of FIG. 1.
Figure 3:
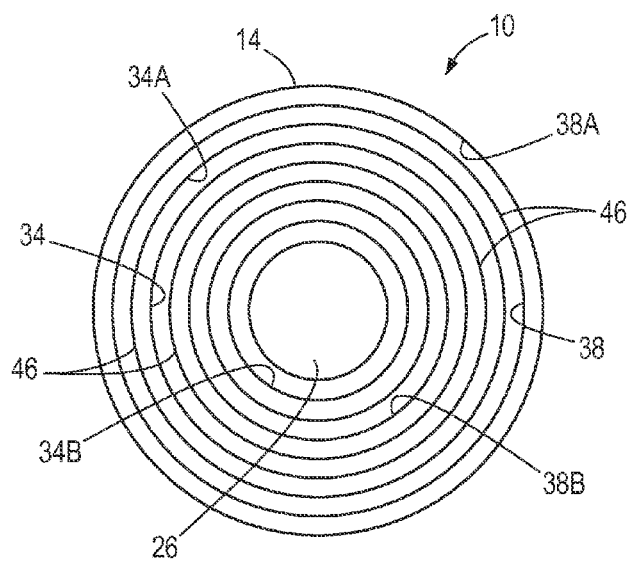
FIG. 3 is a cross-sectional view of the diesel particulate filter taken along section line 3-3 of FIG. 2.

FIGS. 1-3 illustrate an after treatment device 10 for use in an exhaust system 100 of a diesel engine 150. Although the following discussion is made with specific reference to the after treatment device 10, it should be readily apparent to one skilled in the art that the concepts disclosed herein may be readily applied to a variety of chemical process reactions where a relatively high temperature is required for at least one step of the process. In addition, the illustrated after treatment device 10 can be used to reduce other fluid or exhaust emissions such as, for example, hydrocarbon and/or carbon monoxide emissions by providing a kernel of high temperature where the emissions are given sufficient time to complete the appropriate reaction.

In the illustrated embodiment, the after treatment device 10 is a diesel particulate filter (DPF), although other after treatment devices are also contemplated by the present invention. In some embodiments, the diesel engine 150 may be used to power a semi-tractor trailer, a passenger car, heavy machinery, an auxiliary power unit, or the like. As exhaust from the diesel engine 150 flows through the DPF 10, particulate matter and soot are removed (e.g., captured, filtered, combusted) by the DPF 10. The DPF 10 then releases clean, or treated, exhaust (i.e., exhaust containing substantially no particulate matter and soot) into the surrounding environment.

The illustrated DPF 10 includes a housing 14 defining an inlet 18 and an outlet 22, a central core 26 positioned substantially within the housing 14, and a heat exchanger 30. The inlet 18 is configured to couple to a portion of the exhaust system 100, or directly to the diesel engine 150, to receive untreated exhaust from the engine 150. The exhaust flows into the inlet 18, through one side of the heat exchanger 30 to the central core 26, from the central core 26 through another side of the heat exchanger 30, and out the outlet 22. The outlet 22 is configured to couple to another portion of the exhaust system 100 (e.g., an exhaust pipe) to direct treated exhaust out of the DPF 10 and the exhaust system 100. In some embodiments, the inlet 18 and/or the outlet 22 may be removably coupled to the exhaust system 100 to facilitate cleaning and maintenance of the DPF 10. Additionally or alternatively, the inlet 18 and the outlet 22 may be insulated to reduce heat loss from the DPF 10.

The central core 26 is disposed in fluid communication between the inlet 18 and the outlet 22 such that untreated exhaust flowing in the inlet 18 flows through the central core 26 prior to flowing out the outlet 22. At the central core 26, the untreated exhaust is treated (e.g., cleaned) to remove particulate matter and the soot from the exhaust. In the illustrated embodiment, an emission reducing reaction occurs in the central core 26 to clean the exhaust. For example, the central core 26 may include a filter, a trap, an absorber, or a catalyst operable to remove the diesel particulate matter, soot, and/or nitrous oxide (NOx) from the exhaust. In some embodiments, the emission reducing reaction may require a minimum operating temperature, or critical temperature, to clean the exhaust.

The illustrated heat exchanger 30, or preheater or recuperator, is a counter-flow heat exchanger configured to maintain a high core temperature (i.e., temperature at the central core 26) and reduce external heat leakage paths (i.e., paths allowing heat loss from the central core 26 to the surrounding environment). As shown in FIGS. 2 and 3, the heat exchanger 30 includes a first passage 34 configured to direct untreated exhaust from the inlet 18 toward the central core 26, and a second passage 38 configured to direct treated exhaust from the central core 26 toward the outlet 22. In the illustrated embodiment, the first and second passages 34, 38 are concentrically aligned in a heat exchange relationship about the central core 26 to progressively direct the untreated exhaust radially inward toward the central core 26 and progressively direct the treated exhaust radially outward from the central core 26. In such an arrangement, heat is generally retained close to the central core 26.

Although illustrated in cross-section, it should be readily apparent to one skilled in the art that the passages 34, 38 wrap around the central core 26 as concentric rings (i.e., longitudinally extending annular passageways). The concentric rings may be generally circular, oval-shaped, square, rectangular, or the like in cross-section, depending on the desired overall shape and particular application of the DPF 10. In addition to providing a relatively large surface area for heat exchange, the rings provide thermal separation between the central core 26 and an external surface of the housing 14. In some embodiments, the central core 26 may have a relatively smaller diameter and/or the central core 26 may be lengthened to increase the heat exchange area between the first and second passages 34, 38. In other embodiments, the heat exchanger 30 may include secondary features or elements to improve heat transfer and maintain correct spacing between the passages 34, 38.

The first passage 34 includes an outermost ring 34A and an innermost ring 34B. As shown in FIGS. 2 and 3, the outermost ring 34A is spaced radially inwardly from the housing 14 and the innermost ring 34B is positioned directly adjacent to the central core 26. The untreated exhaust flows from the outermost ring 34A to the innermost ring 34B to reach the central core 26. In the illustrated embodiment, the first passage 34 includes four rings between the housing 14 and the central core 26. However, it should be readily apparent that the first passage 34 may include fewer or more rings to decrease or increase the heat exchange area between the first and second passages 34, 38.

The second passage 38 includes an outermost ring 38A and an innermost ring 38B. As shown in FIGS. 2 and 3, the innermost ring 38B is spaced radially outwardly from the central core 26 and the outermost ring 38A is positioned directly adjacent to the housing 14. The treated exhaust flows from the innermost ring 38B to the outermost ring 38A to reach the outlet 22. Similar to the first passage 34, in the illustrated embodiment, the second passage 38 includes four rings between the housing 14 and the central core 26. However, it should be readily apparent that the second passage 38 may include fewer or more rings to correspond with the number of rings in the first passage 34.

Positioning the outermost ring 38A of the second passage 38 directly adjacent to the housing 14 (opposed to the outermost ring 34A of the first passage 34) helps maintain a higher temperature within the first passage 34. As such, the tendency for untreated exhaust to deposit products of combustion (e.g., diesel particulate matter, soot, etc.) on walls or surfaces of the passage 34, and thereby plug the heat exchanger 30, is reduced. In addition, positioning the outermost ring 38A adjacent to, or even acting as, the housing 14 of the DPF 10 helps to conserve heat within the central core 26.

In some embodiments, such as the embodiment shown in FIGS. 2 and 3, the DPF 10 includes a heating element 42. In the illustrated embodiment, the heating element 42 is positioned downstream of the first passage 34 and proximate to the central core 26. The heating element 42 supplies extra energy to the exhaust to further heat the exhaust to a temperature at or above the critical temperature of the emission reducing reaction. In some embodiments, the heating element 42 may include, for example, electrical heating elements, chemical heating elements (e.g., a combustible fuel), or a microwave generator. The heating element 42 may be powered by the engine 150, an engine driven electrical alternator, or by a secondary electrical power source (e.g., a shore power source). Using the heat exchanger 30 in combination with the heating element 42 or other heating means helps reduce the total amount of energy expended by the heating element 42 to make the exhaust reach the critical temperature. For example, if the heating element 42 uses a high power for a short period of time to reach the critical temperature, the illustrated heat exchanger 30 reduces the period of time required to reach the critical temperature. Alternatively, if the heating element 42 uses a low power for a long period of time to reach the critical temperature, the illustrated heat exchanger 30 reduces the amount of power required to reach the critical temperature.

In other embodiments, the DPF 10 may include other heating means such as, for example, intake or exhaust throttling. In such embodiments, air mass flow through the engine 150 (FIG. 1) is reduced (e.g., throttled) while fuel to the engine 150 is supplied at a normal level, thereby increasing the exhaust temperature. Normal airflow (i.e., airflow with a higher oxygen content) is allowed to flow through the engine 150 after a desired exhaust temperature (e.g., a temperature at or near the critical temperature) is reached. When operating in this mode, the mass of the heat exchanger 30 and the heat exchange process provide additional thermal inertia to the DPF 10, allowing the temperature at the central core 26 to remain higher for a longer period of time. This arrangement also allows a longer time for reaction during a given throttling event, thereby lowering fuel consumption.

In still other embodiments, the diesel particulate matter or soluble organic fraction oxidized in the DPF 10 may also contribute to the temperature at the central core 26, thereby promoting further reactions.

As the untreated exhaust flows through the first passage 34, the exhaust exchanges heat with the treated exhaust flowing through the second passage 38. The treated exhaust is generally warmer than the untreated exhaust when an exothermic chemical reaction (e.g., the emission reducing reaction) occurs in the DPF 10, additional heat is supplied to the DPF 10 (e.g., by the heating element 42 or other heating means), the engine 150 (FIG. 1) is transitioning between a high load and a low load, and/or excess heat is stored in the heat exchanger 30. In such scenarios, heat flows from the treated exhaust to the untreated exhaust. Therefore, when the untreated exhaust reaches the heating element 42 and the central core 26, the untreated exhaust is generally warmer than when the untreated exhaust entered the first passage 34. As such, the heating element 42 does not use as much energy (compared to an after treatment device without the heat exchanger 30) to heat the untreated exhaust to the critical temperature. If the diesel engine 150 has been running for a prolonged period of time, the untreated exhaust may receive enough additional heat from the treated exhaust alone so that the heating element 42 does not need to provide any additional or supplemental heating.

Once the untreated exhaust flows through the central core 26 and undergoes the emission reducing reaction, the untreated exhaust becomes treated exhaust which flows through the second passage 38 to exchange heat with untreated exhaust flowing through the first passage 34. The treated exhaust is cooled in the heat exchanger 30 prior to exiting the DPF 10 through the outlet 22.

The heat exchanger 30 provides a means to recover heat downstream of an emission reducing reaction and use this heat to supplement heat additions from a heating element. More particularly, the heat exchanger 30 captures heat near an outlet of an after treatment device and makes this heat available to exhaust flowing into the emission reducing reaction. As such, less energy is required to heat the exhaust and promote proper functioning of the emission reducing reaction, reducing energy consumption (e.g., fuel consumption, secondary power consumption, or the like) and system complexity. Additionally, the amount of catalytic compounds used for the emission reducing reaction may be reduced without impeding the functionality of the reaction, resulting in significant cost reductions.

The heat exchanger 30 is also configured to maintain heat toward a central core of an after treatment device. As such, little or no insulation is required in the device to inhibit heat from reaching an external surface of the device. For example, with the heat exchanger 30, less heat is present near the external surface of the device where a user or other structure may contact the device. That is, the heat exchanger 30 reduces heat leakage paths between the central core and the external surface, resulting in less heat reaching the external surface.

Furthermore, the heat exchanger 30 does not substantially increase exhaust backpressure within an after treatment device. Rather, the heat exchanger 30 keeps exhaust flowing through the device warm, reducing any accumulation of particulates and soot that may otherwise clog an exhaust system.

Figure 4:
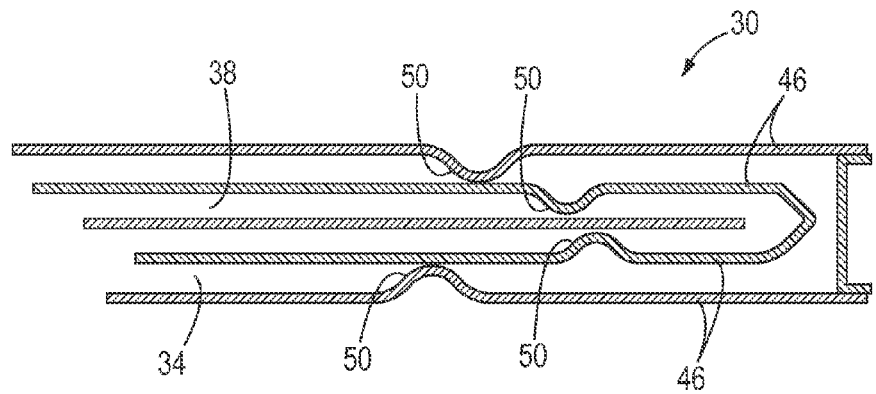
FIG. 4 is an enlarged cross-sectional view of a portion of the diesel particulate filter shown in FIG. 2.

In addition, the heat exchanger 30 is easy to manufacture. The illustrated heat exchanger 30 is constructed from a series of tubes 46. As shown in FIG. 4, at least some of the tubes 46 include detents 50, or dimples, extending toward an adjacent tube 46. The detents 50 contact the adjacent tubes 46 to provide additional support within the heat exchanger 30 and to maintain proper spacing between the tubes 46. In the illustrated embodiment, the detents 50 all extend radially inward to contact the adjacent tubes 46. In other embodiments, the detents 50 may extend in both a radially inward direction and a radially outward direction. The detents 50 increase the surface area of each tube 46 to increase the heat exchange area within each passage 34, 38, or ring. The detents 50 also help create turbulence in the exhaust flowing through the passages 34, 38 to slow down and mix the exhaust, increasing the heat exchange capacity of the heat exchanger 30.

Figure 5:
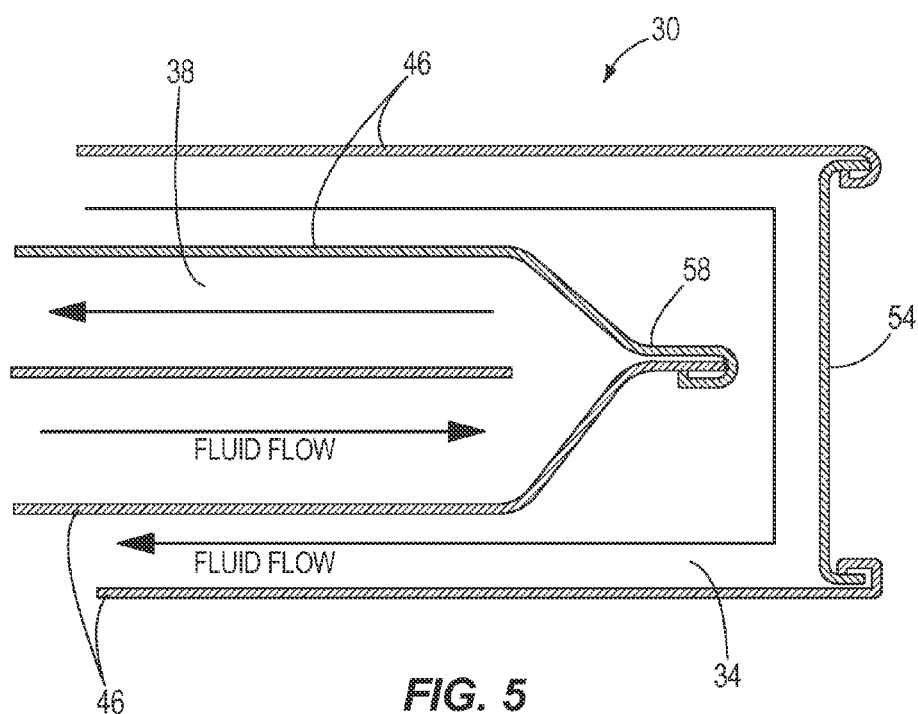
FIG. 5 is another enlarged cross-sectional view of a portion of the diesel particulate filter shown in FIG. 2.

Connections between the tubes 46 may be made by conventional edge welding or crimping, instead of by complicated stamping and joining operations. For example, as shown in FIG. 5, ends 54, 58 of the tubes 46 are crimp sealed to help define the first and second passages 34, 38, respectively. In some embodiments, the ends 54, 58 may also be insulated to help maintain heat within the heat exchanger 30. In other embodiments, the ends 46, 50 may be formed by furnace brazing, resistance seam welding, fusion welding (e.g., tungsten inert gas (TIG) welding), or the like. As such, the illustrated heat exchanger 30 provides a relatively large heat exchange surface area with a minimum amount of joints for easy, low cost, and reliable manufacturing.

Various features and advantages of the invention are set forth in the following claims.

What is claimed is:
1. An after treatment device comprising:
a housing defining an inlet and an outlet;
a core positioned within the housing, the core being configured to treat a fluid; and
a heat exchanger positioned within the housing and about at least a portion of the core, the heat exchanger including a first plurality of concentric rings surrounding the at least a portion of the core and configured to progressively direct untreated fluid from the inlet radially inward toward the core, and a second plurality of concentric rings surrounding the at least a portion of the core and configured to progressively direct treated fluid radially outward from the core toward the outlet.

2. The after treatment device of claim 1, wherein the treated fluid is generally at a higher temperature than the untreated fluid, and wherein the second passage is in a heat exchange relationship with the first passage such that the treated fluid heats the untreated fluid before the untreated fluid flows into the core.

3. The after treatment device of claim 1, wherein the second plurality of concentric rings includes an outermost ring, and wherein the outermost ring is directly adjacent to the housing.

4. The after treatment device of claim 1, wherein the first plurality of concentric rings includes an innermost ring, and wherein the innermost ring is directly adjacent to the core.

5. The after treatment device of claim 1, wherein the first and second plurality of concentric rings are defined by a series of tubes, and wherein at least one tube includes a detent contacting an adjacent tube of the series of tubes.

6. The after treatment device of claim 1, wherein the first and second plurality of concentric rings are defined by a series of tubes, and wherein ends of the series of tubes are crimp sealed to help define the first passage and the second passage, respectively.

7. The after treatment device of claim 1, further comprising a heating element positioned within the housing, wherein the heating element heats the untreated fluid as the untreated fluid flows into the core.

8. The after treatment device of claim 1, wherein the inlet is in communication with a diesel engine to receive untreated exhaust from the diesel engine, and wherein the core cleans the untreated exhaust such that treated exhaust is discharged from the outlet.

9. The after treatment device of claim 1, wherein the after treatment device is a diesel particulate filter.

10. The after treatment device of claim 1, wherein the first plurality of concentric rings has an innermost ring disposed adjacent the core, and wherein the innermost ring defines a warmest untreated fluid passage.

11. The after treatment device of claim 1, wherein the second plurality of concentric rings has an outermost ring disposed adjacent an exterior of the housing, and wherein the outermost ring defines a coolest treated fluid passage.

12. The after treatment device of claim 1, wherein the first plurality of concentric rings and the second plurality of concentric rings are positioned about the at least a portion of the core in a heat exchange relationship.

13. The after treatment device of claim 12, wherein the heat exchanger is generally cylindrical.

14. An exhaust system comprising:
an engine; and
an after treatment device including
a housing defining an inlet in communication with the engine and an outlet,
a core positioned within the housing, the core being configured to treat exhaust from the engine, and
a heat exchanger positioned within the housing and about at least a portion of the core, the heat exchanger including a first plurality of concentric rings surrounding the at least a portion of the core and configured to progressively direct untreated exhaust from the inlet radially inward toward the core, and a second plurality of concentric rings surrounding the at least a portion of the core and configured to progressively direct treated exhaust radially outward from the core toward the outlet.

15. The exhaust system of claim 14, wherein the treated exhaust is generally at a higher temperature than the untreated exhaust, and wherein the second passage of the heat exchanger is in a heat exchange relationship with the first passage such that the treated exhaust heats the untreated exhaust before the untreated exhaust flows into the core.

16. The exhaust system of claim 14, wherein the first plurality of concentric rings and the second plurality of concentric rings are positioned about the at least a portion of the core in a heat exchange relationship.

17. The exhaust system of claim 14, wherein the second plurality of concentric rings includes an outermost ring, and wherein the outermost ring is directly adjacent to the housing of the after treatment device.

18. The exhaust system of claim 14, wherein the first plurality of concentric rings includes an innermost ring, and wherein the innermost ring is directly adjacent to the core of the after treatment device.

19. The exhaust system of claim 14, wherein the after treatment device further includes a heating element positioned within the housing, and wherein the heating element heats the untreated exhaust as the untreated exhaust flows into the core.

20. The exhaust system of claim 14, wherein the after treatment device is a diesel particulate filter.

21. The exhaust system of claim 14, wherein the first plurality of concentric rings has an innermost ring disposed adjacent the core, and wherein the innermost ring defines a warmest untreated fluid passage.

22. The exhaust system of claim 14, wherein the second plurality of concentric rings has an outermost ring disposed adjacent an exterior of the housing, and wherein the outermost ring defines a coolest treated fluid passage.

23. A method of treating exhaust from an engine with an after treatment device, the after treatment device including a housing defining an inlet in communication with the engine and an outlet, a core positioned within the housing, and a heat exchanger, the method comprising:
positioning the heat exchanger within the housing of the after treatment device and about at least a portion of the core, the heat exchanger including a first plurality of concentric rings surrounding the at least a portion of the core and a second plurality of concentric rings surrounding the at least a portion of the core;
progressively directing untreated exhaust from the inlet of the after treatment device through the first plurality of concentric rings radially inward toward the core;
treating the untreated exhaust at the core; and
progressively directing treated exhaust radially outward from the core through the second plurality of concentric rings toward the outlet of the after treatment device.

24. The method of claim 23, wherein the treated exhaust is generally at a higher temperature than the untreated exhaust, and further comprising heating the untreated exhaust in the first passage with the treated exhaust in the second passage.

25. The method of claim 23, further comprising positioning a heating element within the housing, and heating the untreated exhaust with the heating element as the untreated exhaust flows into the core.

* * * * *